(12) United States Patent
Johnson

(10) Patent No.: US 6,898,577 B1
(45) Date of Patent: May 24, 2005

(54) METHODS AND SYSTEMS FOR SINGLE SIGN-ON AUTHENTICATION IN A MULTI-VENDOR E-COMMERCE ENVIRONMENT AND DIRECTORY-AUTHENTICATED BANK DRAFTS

(75) Inventor: Richard C. Johnson, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 702 days.

(21) Appl. No.: 09/272,056

(22) Filed: Mar. 18, 1999

(51) Int. Cl.$^7$ ............................................. G06F 17/60
(52) U.S. Cl. ............................ 705/51; 705/67; 705/57; 705/1; 705/58
(58) Field of Search ............................ 705/57, 58, 26, 705/64, 44, 76, 413, 1, 50, 51, 39, 74; 713/200, 201, 202, 186; 380/241, 278, 284, 24

(56) References Cited

U.S. PATENT DOCUMENTS

| | | | |
|---|---|---|---|
| 4,903,201 A | | 2/1990 | Wagner |
| 5,677,955 A | * | 10/1997 | Doggett et al. ............... 380/24 |
| 5,794,207 A | | 8/1998 | Walker et al. |
| 5,845,265 A | | 12/1998 | Woolston |
| 5,903,721 A | * | 5/1999 | Sixtus ........................ 713/201 |
| 6,029,150 A | * | 2/2000 | Kravitz ........................ 705/39 |
| 6,529,885 B1 | * | 3/2003 | Johnson ....................... 705/64 |

FOREIGN PATENT DOCUMENTS

JP      02002279198 A    *   9/2002

OTHER PUBLICATIONS

IBM Technical Disclosure Bulletin; Secure Loading of a personal computer Application; vol. 39; Issue No. 6; Jun. 1, 1996.*

* cited by examiner

Primary Examiner—Pierre E. Elisca
(74) Attorney, Agent, or Firm—Young Law Firm, P.C.

(57) ABSTRACT

A computer-implemented draft authentication method for use in e-commerce includes the steps of establishing partner relationships between a financial institution and a plurality of World Wide Web (Web) vendors and storing, for each of a plurality of Web customers, at least one piece of unique identifying information linked to the Web customer's financial information. Web customers executing drafts or causing drafts to be executed by the Web vendors and presented to the financial institution are authenticated by immediately encrypting at least a portion of an identification data set provided by the Web customer over the network and by successfully matching the immediately encrypted identification data set with the stored piece(s) of encrypted identifying information. The Web customer's financial information is then retrieved only by the financial institution and constraints are established based-on the retrieved information. The financial institution then honors drafts presented by the Web vendors with whom the drawee has a partner relationship only when the Web customer is successfully authenticated and the constraints are satisfied. Only the identification information (such as biometric data and/or ID and password pairs) of each of the Web customers is securely replicated from the financial institution to each of the Web vendors. LDAP-compatible Directory software may be utilized as the means of storing, processing and replicating the Web customer's identification information to each of the Web vendors. The financial institution warrants the security of the system and controls the replication and content of the Directories at each of the Web vendor sites.

40 Claims, 4 Drawing Sheets

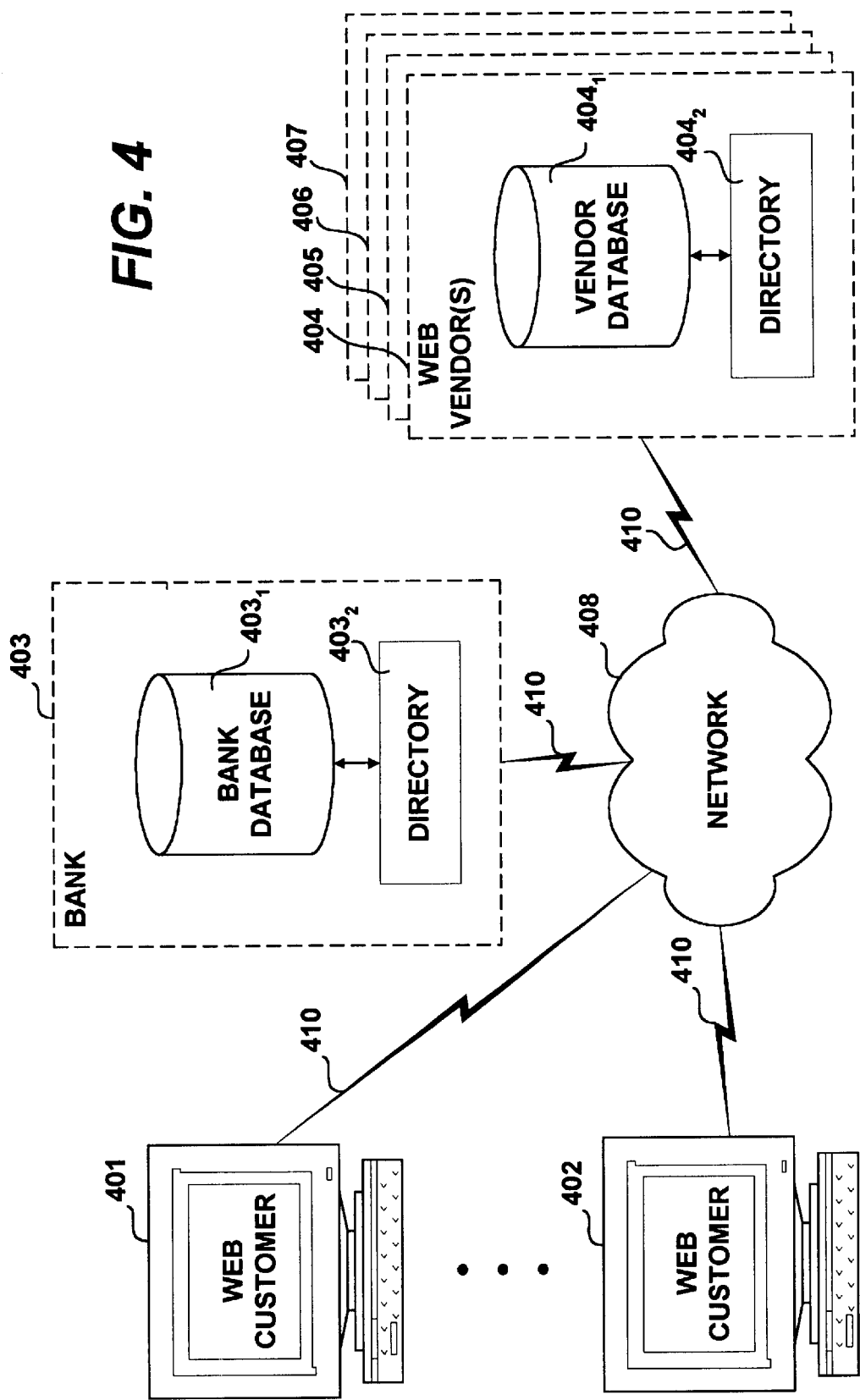

METHODS AND SYSTEMS FOR SINGLE SIGN-ON AUTHENTICATION IN A MULTI-VENDOR E-COMMERCE ENVIRONMENT AND DIRECTORY-AUTHENTICATED BANK DRAFTS

BACKGROUND OF THE INVENTION

1. Field of the Invention

This invention relates to the field of customer and draft authentication in electronic commerce (hereafter "e-commerce"). More particularly, the present invention relates to methods and systems that allow a single sign-on authentication of customers in a multi-vendor e-commerce environment and to methods and systems for directory authentication of electronic bank drafts.

2. Description of the Related Art

The network of computers and networks commonly known as the Internet, initially developed as a military and academic communications tool, has now matured into a global communications medium. The explosive growth of the Internet, together with the increasingly ubiquitous availability of high bandwidth access thereto, has spurred efforts in adapting this medium for commercial purposes. The twin developments of the World Wide Web (hereafter "Web") and the software tools for navigating the Web known as "browsers" have been instrumental in facilitating popular acceptance of the buying and selling of goods and services on the Internet. Currently, a person wishing to buy goods and/or services on the Web (hereafter "Web customer") must first find the Universal Resource Locator (hereafter "URL") of the merchant of interest (hereafter "Web vendor"), typically using a search engine or a portal. Alternatively, the user may learn the URL of a vendor from an advertisement or may store the URL obtained through whatever source and visit the vendor site directly without going through a portal or search engine. Thereafter, the Web customer must navigate to the Web vendor's Web site, using his or her Web browser. After selecting the product the Web customer wishes to purchase, the Web customer is typically invited to fill out a lengthy electronic form on the Web vendor's site. Such electronic forms usually request personal and confidential information, including at least the user's name, address, telephone numbers, email address, and credit card information. Often, the Web customer is requested or invited to select a personal and unique identification tag (hereafter "ID") and a password. Such ID and password pairs may then allow the Web customer to bypass much of the data entry in the Web vendor's electronic form upon his or her next visit to the Web vendor's site. This, however, entails that the Web vendor collects and stores the personal and billing information for each Web customer. Although the majority of Web vendors may carefully secure and safeguard this wealth of personal information, the possibility exists that such information may be used for purposes other than originally contemplated by the Web customer. Credit or charge card information is particularly sensitive to fraud and misuse. Indeed, a stolen (or misappropriated) but otherwise valid credit card number may readily be fraudulently used to purchase goods or services over the Web, due to the lack (or widely disparate nature) of security measures deployed by Web vendors to prevent such credit or charge card fraud. Such fraud is detrimental to all involved parties, including the credit card issuers the Web customers as well as the Web vendors, who must expend time and energy processing customer complaints. The financial loss from credit card affects both credit card issuers as well as the customer; the major loss, however, may be experienced by the merchant who has parted with the goods and has had the charge disallowed by the credit card issuer. For the merchant, this loss is a major disadvantage in the use of credit cards for e-commerce.

However, it is not only the Web customer's credit card information that may be stolen. Potentially far more damaging is the possibility of what may be called identity theft, the misappropriation and misuse of a person's personal and financial information. The specter of identity theft is looming ever larger, as these Web-based electronic forms provide a prepackaged, one-stop shopping source of highly detailed confidential information to unscrupulous individuals having access thereto. Although the vast majority of Web vendors are honorable and have established procedures aimed to thwart identity theft, the sheer proliferation of Web vendors on the Internet virtually ensures that such thefts will become increasingly commonplace.

Perhaps less actionable (but just as frustrating) is the possibility of what may be termed "identity confusion". Here, one person may be confused for another and their respective personal information may be substituted or merged with one another. For example, a Web vendor or credit agency may mistakenly merge two records of two identically named but separate persons. Again, this problem can only be exacerbated by the proliferation of Web vendors on the Internet, each requesting, warehousing and perhaps mining and/or selling the personal and financial information obtained from their Web customers.

This proliferation of Web vendors also means that Web customers are repeatedly requested to select a great many separate ID's and passwords pairs, one for each Web vendor. It may become difficult, therefore, for the Web customer to remember these ID-password pairs and/or to associate a particular ID-password pair with a particular Web vendor. Some Web customers resort to selecting a single ID-password pair and using that single ID-password pair for all of the Web vendors with whom they conduct business. This, however, is a less than satisfactory solution, as such Web customers are more vulnerable to fraud should the single ID-password pair be misappropriated.

The perceived lack of security, simplicity and homogeneity in the data collection across Web vendors operate as barriers to entry into e-commerce, discouraging many potential customers from purchasing goods and services on line. Web customers, therefore, have an interest in promoting simple, homogeneous and secure Web-based transactions. What are needed, therefore, are methods and systems that allow financial transactions to be carried out on the Internet or other network in a manner that is simple, homogeneous across Web vendors and conducted in a manner that ensures the integrity and security of the Web customers' personal and financial information.

The interests of Web vendors are generally aligned with those of their customers, in that Web vendors have an interest in promoting simple and secure e-commerce, so as to attract the greatest possible number of customers to their site. If an alternative to the indiscriminate collection of customer's personal and financial information is to be implemented, Web vendors must be confident that they will be indeed paid for the goods or services they provide. What are needed, therefore, are methods and systems that will promote the interests of Web vendors and provide them with the complete assurance that they will be paid for the goods and services sold from their Web sites in a timely manner.

Curiously enough, banks thus far have not been an integral party to Web customer Web vendor transactions. Indeed, although the money is ultimately debited from the Web customer's bank account, or charged to his or her credit or charge card, the customer's bank or other financial institution has not typically been actively involved in e-commerce transactions, as such transactions are conventionally structured. What are also needed, therefore, are methods and systems that include financial institutions such as banks as integral and central participants in e-commerce transactions.

SUMMARY OF THE INVENTION

It is an object of the present invention, therefore, to provide methods and systems that allow financial transactions to be carried out on a network such as the Internet in a manner that is simple and homogeneous across Web vendors and in a manner that ensures the integrity and security of the Web customers' personal and financial information. It is a further object of the invention to provide methods and systems that will promote the interests of Web vendors and provide them with the assurance that they will be paid in a timely manner for the goods and services sold from their Web sites. Another object of the present invention is to provide e-commerce methods and systems that include financial institutions such as banks as integral and central participants in Web-based and like transactions.

In accordance with the above-described objects and those that will be mentioned and will become apparent below, a computer-implemented draft authentication method for use in e-commerce, according to an embodiment of the present invention, comprises the steps of establishing partner relationships between a draft drawee and a plurality of draft payees and storing, for each of a plurality of draft drawers, at least one piece of unique identifying information, the at least one piece of unique identifying information being linked to at least the drawer's financial information. A step of authenticating a drawer of a draft by immediately encrypting at least a portion of an identification data provided by the drawer and successfully matching the immediately encrypted identification data with the at least one stored piece of identifying information is thereafter carried out. At least the drawer's financial information is retrieved and constraints are established based on the retrieved financial information. A draft presented by a payee with whom the drawee has a partner relationship is then honored only when the drawer of the presented draft is successfully authenticated by drawee and the constraints are satisfied.

A computer-implemented method of carrying out secure e-commerce over the World Wide Web (Web), according to another embodiment of the present invention, comprises the steps of assigning a unique ID and password to each of a plurality of Web customers; encrypting and storing at least the password of each of the plurality of Web customers; establishing partner relationship between at least one financial institution and a plurality of Web vendors and authenticating Web customers by requesting, encrypting and matching passwords provided the Web customers with the stored and encrypted passwords corresponding to the Web customers' ID. The authenticated Web customers may then be provided with access to the plurality of Web vendors with whom the financial institution has a partner relationship via a secure Web site. Drafts presented by the Web vendors accessed through the secure Web site for purchases made by the authenticated Web customers may then be honored by the financial institution, provided predetermined constraints are met.

A computer system for carrying out e-commerce, according to a still further embodiment, comprises at least one first computer managed by a financial institution, the first computer maintaining a primary Directory (first Directory) software storing a plurality of IDs and corresponding encrypted passwords of a plurality of Web customers that maintain a relationship with the financial institution. At least one second computer is managed by a Web vendor, the second computer maintaining a secondary Directory (second Directory) software storing a master list controlled and periodically updated by the primary Directory software, the master list including the plurality of IDs, the corresponding encrypted passwords and an identification of the financial institution. At least one Web-enabled device is managed by a Web customer, the Web-enabled device being adapted to accept input from the Web customer and to communicate with the second computer to send a Web customer input ID and a Web customer input encrypted password to the secondary Directory software. The secondary Directory software then compares the Web customer input ID and password to entries in the master list or to an entry in the secondary Directory which is derived from the master list or from the primary Directory. The Web customer is authenticated by the secondary Directory software only upon matching both the Web customer input ID and encrypted password to an entry in the master list. Only drafts executed by authenticated and participating Web customers are honored by the financial institution.

BRIEF DESCRIPTION OF THE DRAWINGS

For a further understanding of the objects and advantages of the present invention, reference should be made to the following detailed description, taken in conjunction with the accompanying figures, in which:

FIG. 4 shows a system or a network of computing devices adapted to carry out embodiments of the present invention, each of the computing devices being coupled to a network (such as the Internet, for example).

DESCRIPTION OF THE PREFERRED EMBODIMENTS

Functional Overview

Figures 1A, 1B:
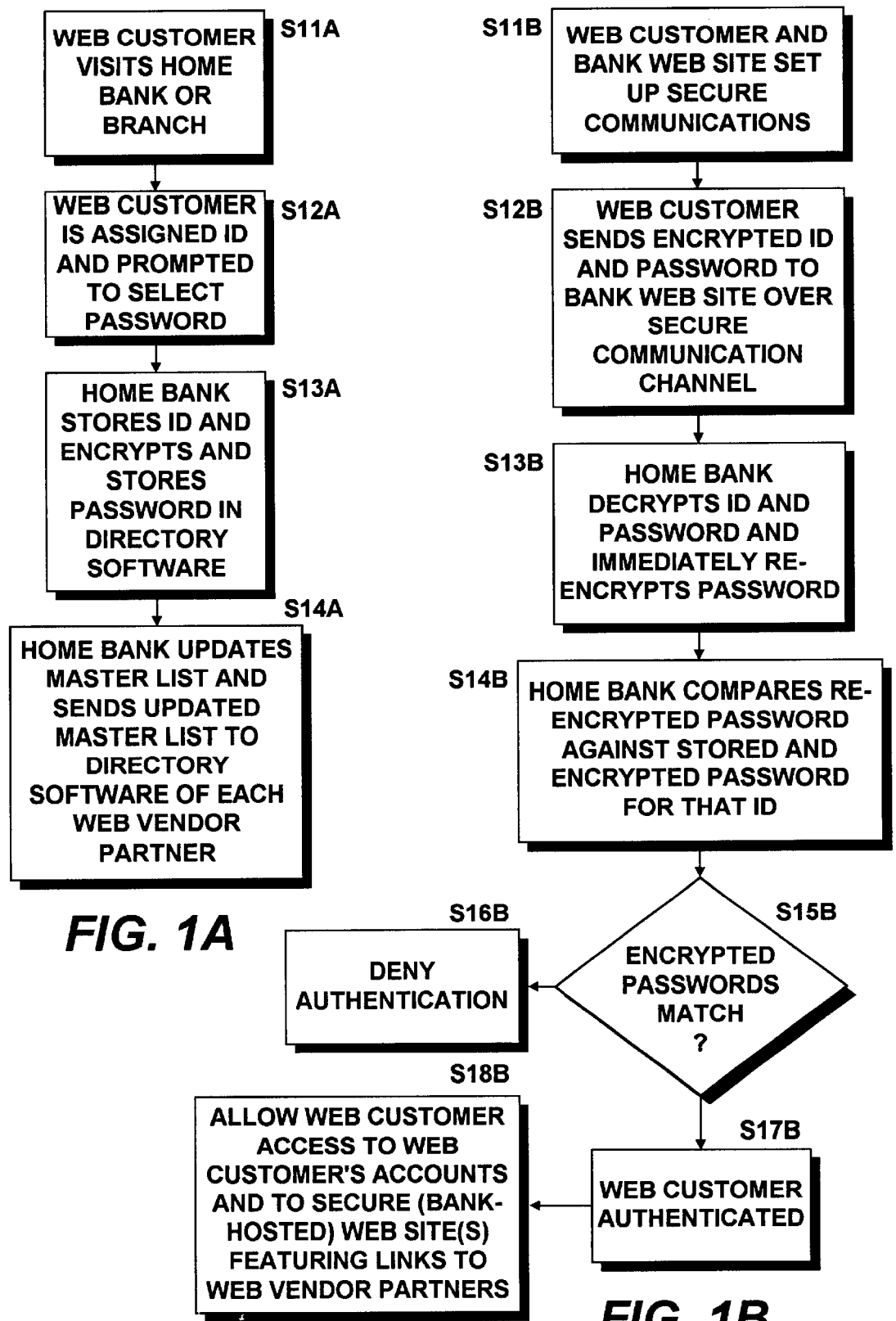
FIG. 1A is a flowchart illustrating an aspect of an embodiment of the present invention, wherein a Web customer signs on with his or her home bank to participate in the Directory-authenticated bank draft system (the "iDraft™" system).
FIG. 1B is a flowchart illustrating another aspect of an embodiment of the present invention, depicting the steps taken by the Web customer's home bank to authenticate the Web customer to the Web vendor or to allow the Web customer to access the bank's Web vendor partners from the bank's Web site or portal.

The present invention solves many of the problems inherent in conventional e-commerce schemes; notably the dissemination of personal and/or financial information across unsecured networks and Web vendors, transactional security, the need to repeatedly re-enter personal information and the dangers of identity theft and identity confusion, to name a few. According to the present invention, only a limited number of entities (and preferably only one such entity) holds the Web customer's personal and/or financial information, such as bank account numbers and credit/charge card numbers. Preferably, the entity to hold such information is an entity that already enjoys a relationship of trust with the prospective or existing Web customers, such as the Web Customers' bank or banks, credit card holders, etc. In this manner, none of the Web vendors (or fewer Web vendors) hold or have access to the Web customers' personal and/or financial information, such as account numbers, credit card numbers, passwords and the like.

The present invention allows e-commerce to be carried out, if desired, without recourse to credit or charge cards while maintaining a high degree of security for the Web customer and a high degree of reliability for the Web vendor. Indeed, the present invention allows drafts to be executed by the Web customer over the Internet (or some other public, private or virtual private network) and presented by the Web vendor to the financial institution for payment, in much the same manner as with checks (a specific form of a draft). However, unlike checks, the execution, presentment and payment thereof may be carried out, according to the present invention, in electronic form and without the intermediary of check clearinghouses that form an integral part of negotiating a conventional "paper" check. Using generally accepted legal terms, a draft is a written order by a first party, called the drawer, instructing a second party, called the drawee, to pay money to a third party, called the payee. In terms of e-commerce and the present invention, the Web vendor may be thought of as the payee, the Web customer may be thought of as the drawer and the financial institution, such as the bank, may be thought of as the drawee. Herein, the terms "financial institution" and "bank" are used interchangeably and shall be understood to include all institutions maintaining customer accounts and handling and/or exchanging money or securities, such as a stock broker, credit union or a savings institution, for example.

Since a draft may also be thought of as an unconditional promise to pay money to the order of the payee, the drawee (such as the bank and/or other financial institution) has a great interest in properly authenticating (positively verifying the identity) of the drawer of the draft. Indeed, the bank (and typically not the account holder) may be obligated to bear the loss in cases wherein an improper authentication has been made. The primary means of authenticating the drawer of a conventional paper-based draft (a check, for example) is the drawer's signature, an exemplar of which is typically stored in a card file within the bank. Instead of a signature, an embodiment of the present invention contemplates the use of identifying information such as an identification string and password pair and/or biometric data. The biometric data may include any physical characteristic that distinguishes one drawer from all others, such as fingerprints, retinal scans and/or voiceprints, for example. An illustrative embodiment of the present invention is disclosed below wherein the identification information includes the identification string and password pair, it being understood that other identification information (such as biometric data, for example) may be substituted therefor or used in conjunction therewith without departing from the scope of the present invention.

The identification string (hereafter "ID") preferably includes both alphabetical and numerical (alphanumerical) characters and uniquely identifies the draft drawer (such as a Web customer) from other drawers. The bank may conduct test to ensure the uniqueness of the ID. Likewise, the password also preferably includes alphanumeric characters. The ID may, according to an embodiment of the present invention, be assigned to the Web customer, whereas the password is preferably selected by and known only to the participating Web customer, to the exclusion of all others, including the drawee (such as the bank) and the payees (such as the Web vendors). To insure that the selected passwords remains known only to the Web customer, the selected password is preferably immediately encrypted upon receipt thereof and stored by the bank only in its encrypted form. This may protect the bank from claims of misappropriation of the Web customer's password and ID. Embodiments of the present invention are explained in detail with reference to FIGS. 1A through 4.

As shown in FIG. 1A, the Web customer may initiate the method according to the present invention by visiting his or her home bank or branch office to give and/or receive signed authorization, as shown at step S11A. Alternatively, the Web customer may log onto his or her home bank Web site (or other equivalent bank presence on a public or private network), although some banks may prefer or require the Web customer to physically visit the bank or branch to fill out the necessary paperwork. A Web customer's home bank may be the Web customer's broker or savings institution, or may be that bank at which he or she maintains a checking account, for example. Preferably, the Web customer and the bank establish a secure communications channel using some agreed upon and standardized protocol, such as the Secure Socket Layer (hereafter "SSL") protocol, for example. SSL utilizes a first encryption scheme (such as a public key encryption scheme, for example) negotiated at the time of the communication and helps to ensure that electronic eavesdroppers between the Web customer and the bank cannot intercept any clear, unencrypted communication. Such a SSL may be negotiated between the Web customer's Web browser software, for example, and the bank's World Wide Web server. Once the Web customer has reached the bank's Web site (or physically visited the bank and authorized the service), the Web customer may be assigned an ID and prompted to select a password after filling out any appropriate paperwork, as outlined at step S12A. Alternatively, the Web customer may select both ID and password, be assigned both ID and password, or any permutation thereof. The ID and the password encrypted using the first encryption scheme are then decrypted within the bank's server. The home bank, as shown at S13A, then stores the Web customer's ID and preferably immediately re-encrypts the Web customer's password using a second encryption scheme. The second encryption scheme is preferably different from the first encryption scheme or may be the same as the first encryption scheme. The re-encrypted password is then stored within the bank's server or other storage device.

By immediately re-encrypting the Web customer's password without storing or having access to same, the bank insures that the password remains known only to the Web customer. Thus, even the bank does not know the un-encrypted, clear password selected by the Web customer. As shown in step S14A, the home bank, according to an embodiment of the present invention, may then update a master list and transmit the updated master list to each Web vendor with whom the bank has established a partnership relation; i.e., to each Web vendor participating the "iDraft™" program according to the present invention. The master list, according to an embodiment of the present invention, may include a list of Web customers identified by their ID and an identification of the Web customers' home bank. Steps S11A through S14A form part of the preferred framework of the present invention, and form the infrastructure allowing a single sign-on, secure electronic draft authentication method and system.

FIG. 1B is a flowchart illustrating a further aspect of the present invention, and depicts steps that may be taken by a Web customer's home bank to authenticate a Web customer wishing to purchase goods or services from a Web vendor with whom the bank has a partnership relationship. In step S11B, a Web customer and his or her home bank establish secure communications, using a first encryption scheme. The first encryption scheme, for example, may be negotiated between the Web customer's Web browser software and the home bank's Web server, according to the SSL protocol or some other protocol. Having accessed the home bank's Web site, the Web customer may be prompted to enter his or her ID and password (and/or other biometric data, for example), each of which will be encrypted prior to being transmitted to the home bank's server by the software (such as a Web browser) installed on the Web customer's personal computer, network computer or other network- or Web-enabled device or appliance, as outlined in step S12B. The ID and password, encrypted according to a first encryption scheme, are then received by the home bank's server, and decrypted. The bank's server may then utilize the received Web customer's ID to access the record associated with that ID. The record associated with the received ID preferably contains (or points to) the previously encrypted and stored password for that ID. The previously encrypted and stored password is then retrieved. The password received from the Web customer is immediately re-encrypted by applying thereto a second encryption scheme that is identical to that encryption scheme originally used to encrypt the Web customer's password upon first selection thereof, as shown in step S13B. The two encrypted passwords are then compared, as shown in FIG. 1B at steps S14B and S15B. If the two identically encrypted passwords do not match, the Web customer is not authenticated by the home bank, as shown at S16B. An appropriate message may then be generated and sent to the Web customer prompting him or her to re-enter the ID and password, or to carry out some other action. If the two encrypted passwords match, the Web customer is authenticated (step S17B), meaning that the Web customer's identity has been verified to the satisfaction of the entity that bears the risk of lost; namely, the financial institution. The Web customer may then, according to an embodiment of the present invention, be given access to his or her accounts at the home bank as well as access to the home bank's secure Web site or to secure Web sites hosted by the bank for example. Such secure Web sites may include, for example, a payee (Web vendor) list including, for example, Universal resource Locators (URLs) or some other network-relevant addresses or links to those Web vendors with whom the home bank has a partner relationship, as shown at step S18B. Alternatively, the home bank may grant the authenticated Web customer access to the Web sites of selected Web vendors with whom the bank has a partner relationship. Once authenticated, the Web customer may remain authenticated for the length of the current session, as long as the Web customer remains within the bank's Web site or within Web sites of Web vendors with whom the bank has established a partner relationship. Once the Web customer leaves such Web sites, he or she is preferably no longer authenticated and must be re-authenticated should he or she wish to have an electronic bank draft executed and honored by the bank.

The secure home bank's Web site, in this manner, may function as a value-added portal, meaning as a jump station from which authenticated Web customers may transfer to selected Web vendor Web sites. Within the context of the present invention, any network appropriate identifier may be substituted for the term "Web", as the present invention has broader applicability than applications relating solely to the Internet or to the World Wide Web. Having transferred to the Web site of one of the featured Web vendors, the authenticated Web customer may purchase goods and/or services, and cause one or more bank drafts to be executed as payment therefor. As the Web customers accessing the Web vendors' Web sites from the home bank's Web site are already authenticated, the Web vendors may be confident that drafts executed by such authenticated Web customers will be, in fact, honored (paid) by the home bank. Such drafts are preferably presented to the home bank by the Web vendor in electronic and encrypted form, in a manner similar to that utilized by the Web customer in establishing secure communications with his or her home bank, for example.

The home bank, upon receiving, decrypting and re-encrypting the Web customer's password, may retrieve not only the Web customer's (the draft drawer's) financial information, but may also retrieve other relevant information. Such other relevant information may include, for example, the balance in the Web customer's relevant accounts, his or her credit and/or predetermined spending limits. The home bank may then establish constraints based on the retrieved financial information. For example, although the Web customer may be properly authenticated to the bank's satisfaction, the home bank may not honor a draft presented to it by a Web vendor, if the amount to be drawn exceeds the funds available for withdrawal in the Web customer's relevant account(s), lines of credit, cash reserve, credit or charge cards and the like. In this manner, the home bank will honor a draft presented by a payee with whom the drawee has a partner relationship only when the drawer of the presented draft is authenticated by drawee and when the constraints established by the drawee are satisfied. Such constraints may have been previously negotiated and agreed upon by both the bank and the Web customer or may be fixed by the bank, which may condition participation in the "iDraft™" program upon acceptance of such fixed constraints.

Preferably, the home bank stores the Web Customer's ID, encrypted password and other relevant financial and personal information in a data structure managed by Directory software, as shown in the previously-discussed step S13A of FIG. 1A. Directory software typically includes a repository (e.g., a list or database, for example) of names, permissions, resources, hardware, software and hierarchical information and/or rules within a network. The phrase "Directory software", according to the present invention, encompasses any software including or managing such a repository that is designed to operate on computers coupled to a network. More preferably, the home bank stores the above-listed information in a Directory software compatible with and accessible through Directory access software, such as Directory access software compatible with the X.500 Directory Access Protocol (DAP), which is incorporated herein by reference, or a subset, extension or variant thereof. One such subset of DAP is the Lightweight Directory Access Protocol or LDAP. For example, the home banks may implement Oracle Internet Directory™ (OiD™) software (or upgrades/variants thereof), a software product developed by the assignee of the present invention. OiD™ combines a native implementation of >, the Internet Engineering Task Force's (IETF) LDAP v3 standard (also incorporated herewith in its entirety by reference) with, for example, an Oracle8 (or later implementation) back-end data store. In like manner, the Web vendors may also store their master lists of Web customer, encrypted passwords and home bank identifiers within a Directory software compatible with the LDAP v3 (or later versions) protocol, such as the above-identified OiD™ software from Oracle Corporation. Alternatively, the Web vendors may implement other Directory software, such as Novell Directory Services™ (NDS™) of Novell, Inc.

The master list, containing at least the Web customers' ID, encrypted password and an identifier of their home bank or banks are preferably periodically (or upon demand) transmitted to each of the plurality of Web vendors via an LDAP-compatible duplication or replication process. In this manner, the master list in the home bank's Directory software is transmitted, over a secure communication channel (such as a secure Virtual Private Network, for example), to a compatible Directory software of each of the Web vendors with whom the bank has developed a partner relationship. Changes in the master list may then be provided upon request, asynchronously transmitted or broadcast to the Directory software of each of the Web vendors with whom the home bank has a partner relationship. The Directories of the home bank, of branch offices of the home bank and/or the Directories of participating Web vendors may be synchronized and controlled by the home bank's Directory server over the Internet, leased lines, a private network or a Virtual Private Network (to name a few possibilities) by LDAP-formatted messages or by some other standardized communication protocol. To insure transactional security, the bank preferably maintains control over at least the content of (e.g., the master lists stored within, for example) the Directories installed in the Web vendors' servers.

Figure 2:
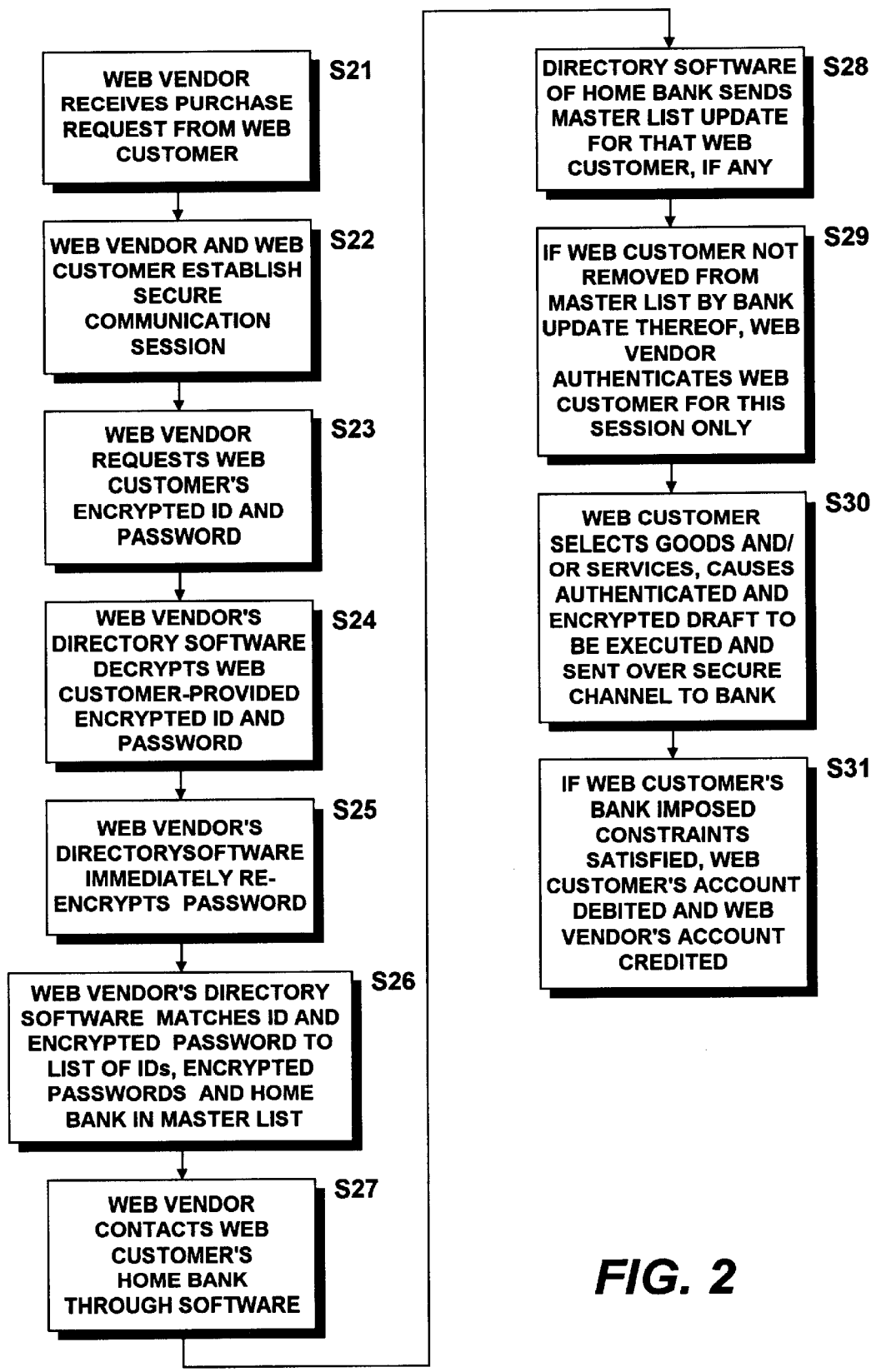
FIG. 2 is a flowchart illustrating certain aspects of an embodiment of the present invention, wherein a Web customer is authenticated by a Web vendor and the Web customer's home bank.

FIG. 2 outlines another aspect of the present invention, wherein a Web customer is authenticated by a Web vendor, in contradistinction to FIG. 1b, wherein the Web customer is authenticated by his or her home bank's Directory software (or some other functionally similar software). As shown in step S21, a Web vendor receives a purchase request from a Web customer. For example, a Web customer may be logged on the Web vendor's Web site via a personal computer or other Web-enabled device, may have selected goods for purchase and may be ready to conclude his or her purchase. Alternately, the Web customer may just have logged onto the Web vendor's site and may be requesting to be authenticated, to gain access to specially featured goods or services, or to gain access to an area in the Web vendor's site that may be reserved for authenticated Web customers, for example. The Web customer and the Web vendor may then establish a secure communication channel conforming, for example, to the SSL protocol (or some other secure and standardized protocol), as shown in step S22. According to step S23, the Web vendor may then request the Web customer's identifying data, such as selected biometric data and/or the Web customer's ID and password, which may be sent together as an encrypted message, via a first encryption scheme negotiated by the Web customer's. Web-enabled device (such as a personal computer, for example) and the Web Vendor's server. For example, a public key encryption scheme may be used as the first encryption scheme. As shown in step S24, the Web vendor's Directory software (or other functionally equivalent and secure software) receives the encrypted message containing the Web customer's ID and password and decrypts the ID and password. As shown in step S25, the Web vendor's Directory software immediately re-encrypts the Web customer's password, using a second encryption scheme. Preferably, the second encryption scheme is different from the first encryption scheme. Moreover, the second encryption scheme must be the same encryption scheme as was used to originally store the Web customer's chosen password. The Web customer-provided password is immediately re-encrypted within the Web vendor's Directory software in a manner that is wholly transparent to the Web vendor. Although there may be a short period of time (on the order of nano- or milliseconds) between the decryption of the password and its later re-encryption, the decrypted password is preferably never accessible to the Web vendor, nor is the un-encrypted password ever stored in a storage device easily accessible to the Web vendor. The process of decrypting the password and re-encrypting same preferably occurs entirely within the Directory software at the Web vendor's site and in a manner that is wholly transparent to the Web vendor: the un-encrypted password is preferably never displayed, stored or otherwise accessible to the Web vendor, his or her employees or other individuals.

Using the Web customer-provided ID and the re-encrypted password (encrypted using the second encryption scheme), the Web vendor's Directory software matches the ID to the ID stored in its master list, and compares the encrypted password provided by the Web customer to the encrypted password stored in the master file corresponding to the Web customer-provided ID, as outlined in step S26. If it is determined that the two encrypted passwords match, the Web customer may be authenticated. This authentication may be trusted if the Web vendor's Directory software is certain that its master list is up to date, such as would be the case if the vendor's Directory is maintained in real time in synchronization with the bank's Directory. Alternatively, after step S26, the Web vendor's Directory software may contact the Directory software of the Web customer's home bank, as shown at S27, to determine if any master list updates are available. Such an update request may take the form of an LDAP-formatted query over the relevant network (such as the Internet), for example. The Web vendor's Directory software knows where to direct this query, as an identification of the Web customer's home bank (such as the home bank's URL or other network-specific address) is preferably included in the master list. In response to this LDAP-formatted query, the Directory software of the Web customer's home bank returns any updates that may be available for this master list to the Web vendor's Directory software, as shown in step S28. Such updates may include, for example, indicia of whether the Web customer is still a customer of the home bank. The master list updates, alternatively, may be automatically sent to all Web vendors with whom the home bank has a partner relationship on a predetermined or adaptive schedule. If the customer has not been removed from the master list, the Web vendor may positively authenticate the Web customer, and allow the requested transaction to proceed. As noted in step S29, the Web vendor authenticates the Web customer for this session only: the Web customer will need to be authenticated again the next time he or she logs on to the Web vendor's Web site. If the Web customer has not already done so in step S21, the now authenticated Web customer selects goods and/or services from the Web vendor's Web site for purchase and causes an authenticated and encrypted draft to be executed and sent over a secure communication channel (such as a virtual private network for carrying data securely over the Internet, for example) to the bank. That is, the Web customer authorizes the Web vendor to create and send an authenticated and encrypted draft or drafts to the Web customer's home bank, as shown in step S30. If the Web customer's bank-imposed constraints are satisfied, as shown in step S31, the Web customer's account is debited for the amount of purchase (plus any applicable fees from the Web customer's home bank and/or the Web vendor) and the Web vendor's account is correspondingly credited for the amount of purchase, as shown in step S31. The payment to the Web vendor may take place via a form of electronic funds transfer, for example, over a secure communications channel or by any other means. The constraints imposed by the Web customer's home bank may include a limit on daily spending, credit limits and/or limits related to the Web customer's account balances at his or her home bank.

The security of the Web customer's personal and/or financial information, as well as the security of the transaction between the Web customer and Web vendor itself, are assured at several levels. Indeed, all communications involving the transfer of identification information and data, such as biometric data and/or IDs, passwords, as well as the transfer of financial information between the Web vendor, customer and home bank are preferably carried out over secure communications channels and encrypted. Moreover, the encryption scheme used to encrypt the Web customer's password is known only to the home bank's Directory software and not to the bank, the Web vendor or the Web customer. All updates of the master list held by the Web vendor's Directory software may be automatically handled on behalf of the bank by the home bank's Directory software, with little or no personal involvement by the Web vendor. Alternatively, the Web vendor's Directory software may asynchronously request an update of its master list before positively authenticating a Web customer, to insure that the Web customer still maintains a relationship with the home bank listed for that Web customer's ID in the master list. In addition, once the Web customer has been authenticated by the home bank and the home bank has authorized payment of the draft (has honored the draft or has agreed to honor the draft), the Web vendor has complete assurance that he or she will, in fact, be paid for the amount of the Web customer's on-line purchase(s). The trusted relationship between the Web customer and his or her home bank, according to the present invention, is extended to include the Web vendor with whom the Web customer transacts e-commerce. The financial institution, such as the Web customer's home bank, therefore, assumes a greater role in e-commerce as the only holder and controller of the Web customer's financial information and the guarantor of security and integrity of e-commerce transactions between the Web customer and the Web vendors with whom the bank has a partner relationship.

The transactional security afforded by the present invention also lends itself to other fields, such as the real estate field. For example, the draft authentication mechanisms disclosed herein are well suited to real estate escrow situations. Indeed, the buyer and/or the seller of real estate might have set up a multi-contingency mechanism wherein funds are transferred only upon release of all existing contingencies. Using the authentication mechanisms according to the present invention, the buyer and/or seller of the property may be positively authenticated by the bank or real estate agency and contingencies may be released from a distance using secure authentication instead of a physical signature. This avoids the inconveniences associated with physically visiting the bank, real estate agency and/or escrow office to release such contingencies and/or to conduct other confidential business. Once all of the contingencies have been satisfied, the escrow funds may be released, upon presentment of a suitable draft therefor, for example.

Inter-bank fund transfers may also be carried out using the methods and devices disclosed herein. Indeed, banks may positively authenticate each other and present and/or receive electronic drafts in a secure fashion. In this manner, the identities of all parties are verified, all inter-bank communications are encrypted and the risk of eavesdropping or identity spoofing between the sending and receiving parties is minimized.

The transactions between the interested parties, such as the Web customer, the Web vendor and the home bank are carried out at great speed, even without the benefit of high-speed connections between the parties. Indeed, the amount of information exchanged during any particular exchange may be on the order of a few hundred bytes and may be less than about 100 bytes, as only a small amount of information is actually transferred between the Web customer, the Web vendor's Directory software and the home bank's Directory software. Indeed, an encrypted message containing the Web customer's ID and password need only use about 100 bytes or less. The communications between the Web vendor and the home bank may be similarly brief. In any event, banks are generally well suited to handle the small added communications bandwidth necessitated by the present invention, as banks typically maintain a high speed communications network to handle existing electronic transactions. As the amount of information to be exchanged during a typical transaction according to the present invention is very small, the Internet is well suited to act as the medium over which the parties communicate. Indeed, even at dial up speeds (on the order of a few tens of kilobits per second at the time of this writing), the Web customer can be very rapidly authenticated and receive confirmation for his or her purchase from the Web vendor (and thus from the Web customer's home bank) in a sufficiently short period of time to foster a wide acceptance of the present invention, both at the Web customer and the Web vendor's level.

Hardware Overview

Figure 3:
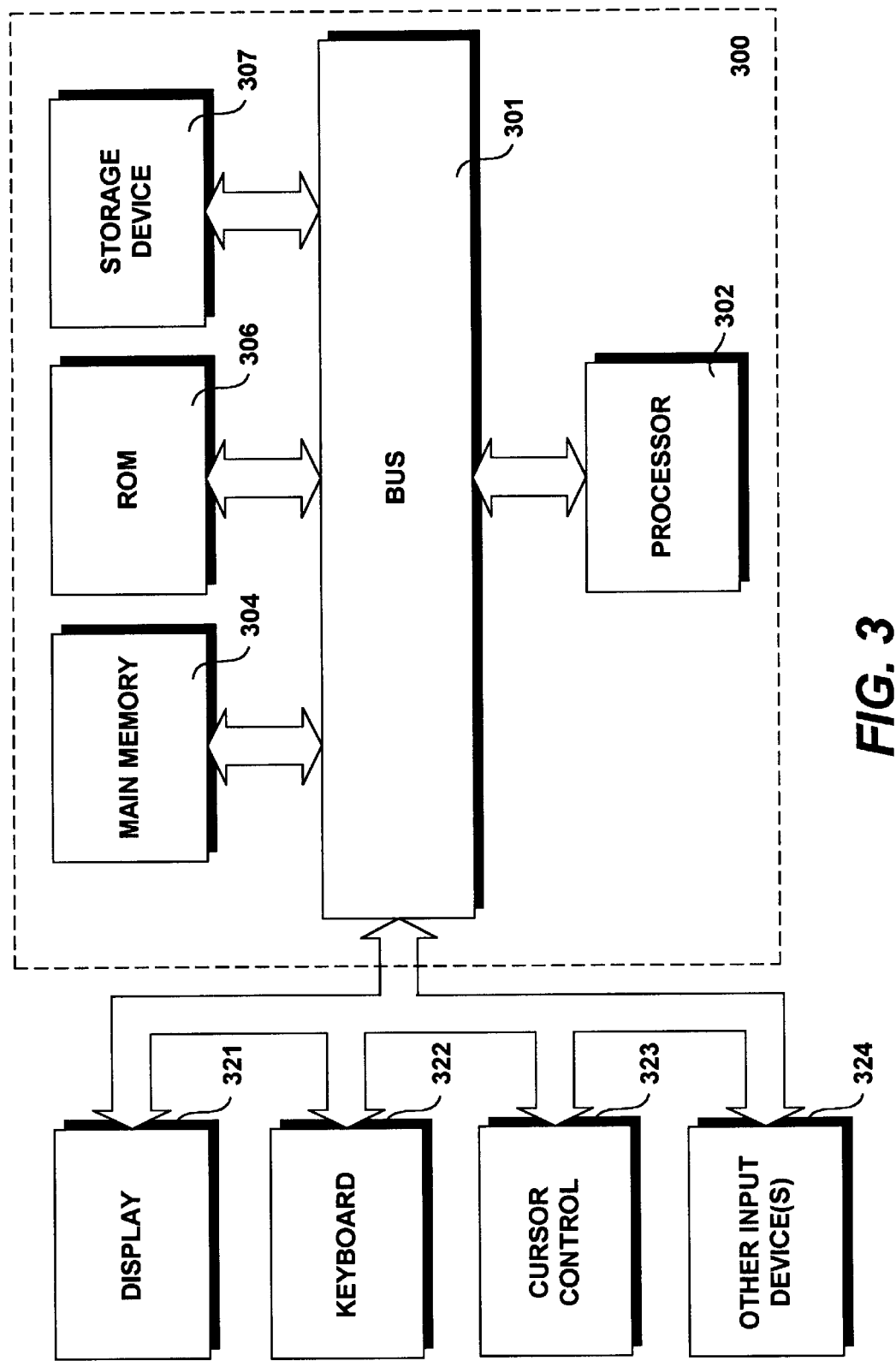
FIG. 3 illustrates a block diagram of a computer with which an embodiment of the present invention may be implemented.

FIG. 3 illustrates a block diagram of a computer 300 with which an embodiment of the present invention may be implemented. Computer system 300 includes a bus 301 or other communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also includes a read only memory (ROM) and/or other static storage device 306 coupled to bus 301 for storing static information and instructions for processor 302. A data storage device 307, such as a magnetic disk or optical disk, is coupled to bus 301 for storing information and instructions.

Computer system 300 may also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321. This input device typically has two degrees of freedom in two axes, a first axis (e.g., x) and a second axis (e.g., y), which allows the device to specify positions in a plane.

Alternatively, other input devices 324, such as a fingerprint reader, a retina scanner and/or other biometric information measuring and/or acquiring devices may be included. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 322 wherein all interface is provided via the stylus as a writing instrument (like a pen) and the written text is interpreted using optical character recognition (OCR) techniques.

The present invention is related to the use of computer system 300 to provide methods and systems for a single sign-on authentication of customers in a multi-vendor e-commerce environment using Directory-authenticated bank drafts. According to one embodiment, the methods according to the present invention are implemented by one or more computer systems 300 in response to processor(s) 302 executing sequences of instructions contained in memory 304. Such instructions may be read into memory 304 from another computer-readable medium, such as data storage device 307. Execution of the sequences of instructions contained in memory 304 causes processor(s) 302 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

FIG. 4 shows a system of computing devices 401–407 adapted to carry out embodiments of the present invention, each of the computing devices 401–407 being coupled to a network 408 (such as the Internet, for example). Each of the computing devices 401–407 may have a structure similar to that outlined in FIG. 3, for example. The Web customers, according to the present invention, may utilize personal computers, workstations, Web-based appliances or any other means of accessing the network 408 through one or more of a variety of network access channels 410. Such means are generically shown at reference numerals 401 and 402. Network access channels 410 may include telephone lines, leased lines, wireless channels and the like. The bank's server, shown at reference 403, is also connected to the network 408 and may include a database 4031 and/or a Directory software 4032. The present invention, therefore, is not dependent upon the use or implementation of Directory software to store, manage and replicate the Web customer's identification information from the bank's server 403 to the plurality of Web vendor servers 404–407. Indeed, it is possible for a database, such as the bank database 403, to be at least partially replicated at other sites, to share specific identification information (such as selected Web customer's biometric data, ID and password pairs, for example, together with an identification of the home bank), with the Web vendors with whom the home bank has a partner relationship, without resorting to Directory software. In like manner, the Web vendors servers or computing devices 404–407, connected to the network 408 via network access channels 410, may each include a vendor database 404, and/or a Directory software 4042 to receive and make effective use of databases replicated from the bank's server. The network 408 may include any type of network, whether public, private or a hybrid of public and private networks. For example, the network 408 may include the Internet.

While the foregoing detailed description has described preferred embodiments of the present invention, it is to be understood that the above description is illustrative only and not limiting of the disclosed invention. For example, other communications and/or computing devices may be developed which allow customers to purchase goods or services of selected vendors remotely, and the inventions disclosed and/or claimed are believed to be readily applicable to such devices. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented draft authentication method for use in e-commerce, comprising the steps of:

storing, for each of a plurality of draft drawers, at least one piece of unique identifying information, said at least one piece of unique identifying information being linked at least to said respective drawer's financial information;

authenticating a drawer of a draft by immediately encrypting at least a portion of an identification data provided by the drawer and successfully matching the immediately encrypted identification data with said at least one stored piece of identifying information;

retrieving at least the drawer's financial information and establishing constraints based on the retrieved financial information;

honoring a draft presented by a payee with whom the drawee has a partner relationship only when the drawer of the presented draft is successfully authenticated by drawee and the constraints are satisfied.

2. The method of claim 1, wherein said at least one piece of identifying information includes at least one of an ID and encrypted password pair and biometric data.

3. The method of claim 1, wherein said at least one piece of unique identifying information for each of the plurality of draft drawers is stored in a data structure managed by a Directory software controlled by the draft drawee.

4. The method of claim 3, wherein at least a portion of the data structure is replicated, via Light Weight Directory Access Protocol (LDAP) or similar standard format, to each of the plurality of draft payees.

5. The method of claim 1, wherein the establishing step further includes the steps of providing a master list to each of the plurality of draft payees, the master list including said at least one piece of unique identifying information for each of the plurality of draft drawers.

6. The method of claim 1, further including the step of making a payee list available to the plurality of draft drawers, the payee list identifying the plurality of draft payees with whom the drawee has a partner relationship.

7. The method of claim 6, wherein the payee list is posted on a secure World Wide Web (Web) site administered by the draft drawee, each member of the list linking to a Web site administered by one of the plurality of draft payees with whom the drawee has a partner relationship.

8. The method of claim 1, wherein the honoring step includes paying the payee and at least one of debiting an account held by the drawee and charging a credit or charge card designated by the drawer of the presented draft.

9. The method of claim 1, wherein the authenticating step authenticates the drawer of the draft only for a session of limited duration.

10. The method of claim 1, wherein the storing step is carried out by Directory software adapted to hold at least one of said unique identifying information; personal information; privileges and other characteristic information for each of said plurality of draft drawers in a secure fashion.

11. The method of claim 1, wherein the identification data provided by the drawer is transmitted to the drawee over a secure communication channel.

12. The method of claim 11, wherein the identification data provided by the drawer is provided in encrypted form over the secure communication channel and wherein the drawee, upon receiving the encrypted identification data, decrypts and immediately re-encrypts the identification data using an encryption scheme different from that utilized over the communication channel and matches the re-encrypted identification data with the previously stored identification information associated with the drawer.

13. The method of claim 1, wherein the draft drawer, the draft drawee and the draft payee communicate over a network.

14. The method of claim 13, wherein the network includes at least one of leased lines, a private network, a virtual private network and the Internet.

15. A computer-implemented method for a financial institution to carry out secure e-commerce over the World Wide Web (Web), comprising the steps of:

assigning a unique ID and password to each of a plurality of Web customers;

encrypting and storing at least the password of each of the plurality of Web customers;

authenticating Web customers by requesting, encrypting and matching passwords provided by the Web customers with the stored and encrypted passwords corresponding to the Web customers' ID;

providing authenticated Web customers with access to a plurality of Web vendors with whom the financial institution has a partner relationship via a secure Web site; and honoring drafts presented by the Web vendors accessed through the secure Web site for purchases made by the authenticated Web customers provided predetermined constraints are met.

16. The method of claim 15, wherein at least the unique ID and the encrypted password for each of the plurality of Web customers are stored in a data structure managed by a Directory software controlled by the financial institution.

17. The method of claim 16, wherein at least a portion of the data structure is replicated, via a Light Weight Directory Access Protocol (LDAP) or similar standard format, to each of the plurality of Web vendors.

18. The method of claim 15, wherein the establishing step further includes the steps of providing a periodically updated master list to each of the plurality of Web vendors, the master list including a plurality of IDs, a plurality of corresponding encrypted passwords and an identification of the financial institution.

19. The method of claim 18, wherein each of the plurality of Web vendors maintains the master list using Directory software adapted to receive and process updates thereof from the financial institution.

20. The method of claim 15, wherein the honoring step includes paying the Web vendor and at least one of debiting an account held by the Web customer and charging a credit or charge card designated by the Web customer, or other bank-sponsored means of making loans and/or extending credit.

21. The method of claim 15, wherein the authenticating step authenticates the Web customer only for a session of limited duration.

22. The method of claim 15, wherein the encrypting and storing step is carried out by Directory software adapted to hold at least one of personal information, passwords, privileges and characteristics of each of the plurality of Web customers in a secure fashion.

23. The method of claim 15, wherein the authenticating step utilizes Directory software to access the stored and encrypted password associated with the Web customer's ID and to match the stored and encrypted password with the immediately encrypted password.

24. The method of claim 15, wherein the password provided by the Web customer is transmitted to the Web vendor over a secure communication channel.

25. The method of claim 24, wherein the password provided by the Web customer is provided in encrypted form over the secure communication channel and wherein the financial institution, upon receiving the encrypted password, decrypts the password before immediately re-encrypting the password using an encryption scheme different from that utilized over the communication channel and matching the re-encrypted password with the previously stored and encrypted password associated with the Web customer's ID.

26. A machine-readable medium having data stored thereon representing sequences of instructions which, when executed by one or more computers coupled to a network, causes said computers to perform the steps of:

storing, for each of a plurality of draft drawers, at least one piece of unique identifying information, said at least one piece of unique identifying information being linked at least to drawer's financial information;

authenticating a drawer of a draft by immediately encrypting at least a portion of an identification data provided by the drawer and successfully matching the immediately encrypted identification data with said at least one stored identifying information;

retrieving at least the drawer's financial information and establishing constraints based on the retrieved financial information;

honoring a draft presented by a payee with whom the drawee has a partner relationship only when the drawer of the presented draft is successfully authenticated by drawee and the constraints are satisfied.

27. The machine-readable medium of claim 26, wherein said at least one piece of identifying information includes at least one of an ID and encrypted password pair and biometric data.

28. The machine-readable medium of claim 26, wherein said at least one piece of unique identifying information for each of the plurality of draft drawers is stored in a data structure managed by a Directory software controlled by the draft drawee.

29. The machine-readable medium of claim 28, wherein at least a portion of the data structure is replicated, via Light Weight Directory Access Protocol (LDAP) or similar standard format, to each of the plurality of draft payees.

30. The machine-readable medium of claim 26, wherein the establishing step further includes the steps of providing a master list to each of the plurality of draft payees, the master list including said at least one piece of unique identifying information for each of the plurality of draft drawers.

31. The machine-readable medium of claim 26, further including the step of making a payee list available to the plurality of draft drawers, the payee list identifying the plurality of draft payees with whom the drawee has a partner relationship.

32. The machine-readable medium of claim 31, wherein the payee list is posted on a secure World Wide Web (Web) site administered by the draft drawee, each member of the list linking to a Web site administered by one of the plurality of draft payees with whom the drawee has a partner relationship.

33. The machine-readable medium of claim 26, wherein the authenticating step authenticates the drawer of the draft only for a session of limited duration.

34. The machine-readable medium of claim 26, wherein the storing step is carried out by Directory software adapted to hold at least one of said unique identifying information;

personal information; privileges and other characteristic information for each of said plurality of draft drawers in a secure fashion.

35. The machine-readable medium of claim 26, wherein the identification data provided by the drawer is transmitted to the drawee over a secure communication channel.

36. The machine-readable medium of claim 35, wherein the identification data provided by the drawer is provided in encrypted form over the secure communication channel and wherein the drawee, upon receiving the encrypted identification data, decrypts and immediately re-encrypts the identification data using an encryption scheme different from that utilized over the communication channel and matches the re-encrypted identification data with the previously stored identification information associated with the drawer.

37. The machine-readable medium of claim 26, wherein the network includes at least one of leased lines, a private network, a virtual private network and the Internet.

38. A computer system for carrying out e-commerce, comprising:

at least one first computer managed by a financial institution, said at least one first computer maintaining a first Directory software storing a plurality of IDs and corresponding encrypted passwords of a plurality of Web customers that maintain a relationship with said financial institution;

at least one second computer managed by a Web vendor, said at least one second computer maintaining a second Directory software storing a master list controlled and periodically updated by the first Directory software, said master list including said plurality of IDs, said corresponding encrypted passwords and an identification of said financial institution;

at least one Web-enabled device managed by a Web customer; said at least one Web-enabled device being adapted to accept input from the Web customer and to communicate with said at least one second computer to send a Web customer input ID and a Web customer input encrypted password to said second Directory software;

wherein said second Directory software compares said Web customer input ID and password to entries in said master list, said at least one Web customer being authenticated by said second Directory software only upon matching both said Web customer input ID and encrypted password to an entry in the master list, said financial institution only honoring drafts executed by authenticated Web customers.

39. The system of claim 38, wherein said at least one first computer, said at least one second computer and said at least one Web-enabled device are coupled to one another by a network.

40. The system of claim 39, wherein the network includes at least one of leased lines, a private network, a virtual private network and the Internet.

\* \* \* \* \*